Oct. 8, 1946.  J. V. SCHAFER  2,409,154
FISHING REEL
Filed Aug. 6, 1943  2 Sheets-Sheet 1

INVENTOR.
JOHN V. SCHAFER
BY
Charles S. Penfold  Atty

Oct. 8, 1946.   J. V. SCHAFER   2,409,154
FISHING REEL
Filed Aug. 6, 1943   2 Sheets-Sheet 2

INVENTOR
JOHN V. SCHAFER
BY
Charles S. Penfold   Atty

Patented Oct. 8, 1946

2,409,154

UNITED STATES PATENT OFFICE 2,409,154

FISHING REEL

John V. Schafer, Bronson, Mich.

Application August 6, 1943, Serial No. 497,570

7 Claims. (Cl. 242—84.5)

This invention relates generally to fishing reels and particularly has to do with improved means for creating a drag whereby to retard rotation of the spool means. More specifically, the invention is directed to an improvement which practically alleviates the necessity for thumbing the spool when making a cast, and at the same time allows the caster to secure a natural and better grip on the rod and thus obtain a superior cast.

Heretofore, in reel construction the means employed for producing the drag or retardation of the spool means primarily consisted in pressing some means, element, or part directly against the spindle, the end of the spool means, or the casting line. These arrangements have not proven very satisfactory from the viewpoint of the caster and the manufacturer because their tendency and effect is to throw parts of the mechanism out of alignment and adjustment and produce friction at points not desired. Furthermore, many are complicated, consisting of many small and intricate fragile parts which are, expensive to manufacture and assemble, susceptible to damage or injury, and easily lost.

Accordingly, one important object of the present invention is to provide improved means cooperable with respect to a part of the reel other than the spindle, spool, or line for obtaining the desired drag or retardation. Broadly, the invention contemplates the provision of means whereby to effect a drag directly on the driving means, preferably the driving gear which cooperates with the pinion secured to the spindle of the spool. In other words, means are provided which are operatively related to the driving means for controlling its movement. Since the driving means including the crank means of the better class of fishing reels are made very sturdy and durable to withstand considerable usage, and the weight thereof causes the overrun when casting, it necessarily follows from an engineering standpoint that the most logical and satisfactory application of the drag means to obtain the results desired should be on the driving means. This location of the drag means is a very important or outstanding feature of the invention.

Another object is to provide drag means embodying improved principles of design and construction, and which although, very simple, has proven most efficient, practical, and durable in actual use.

A further object is to provide a drag unit, sub-assembly or accessory which may be economically manufactured and easily and quickly installed in practically any of the standard low cost reels now in commercial use.

A still further object is to provide for minutely adjusting and positively controlling the action or operation of the means producing the drag.

Other objects and advantages of the invention will become apparent after considering the description hereinafter set forth in conjunction with the drawings annexed hereto, wherein a number of embodiments or modifications to which the invention is susceptible are illustrated.

In the drawings:

Figure 7 is a plan view of a part of the means employed assisting to create the drag in the four embodiments of the invention above referred to.

Figure 1:
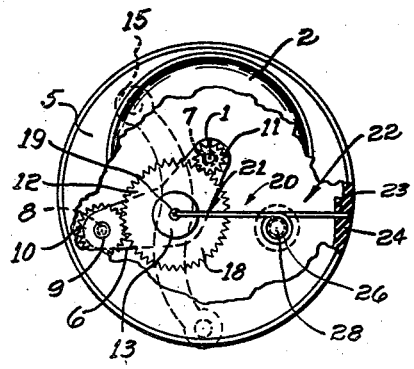
Figure 1 is an end view of a fishing reel, partially in section, showing the application of one embodiment of the invention preferably disposed in the end cap of the reel.
Figure 2:
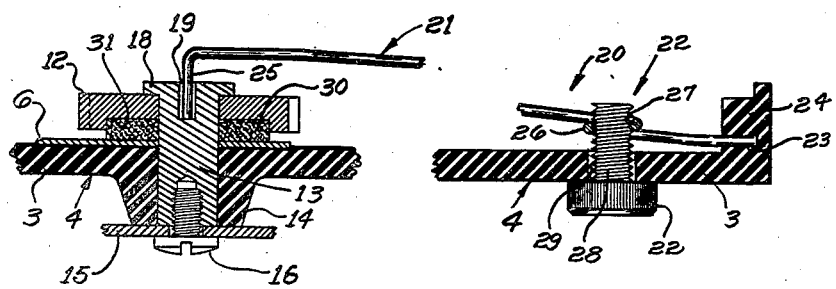
Figure 2 is an enlarged transverse view taken through a part of Figure 1 illustrating certain details of the construction.

Referring to the first embodiment or modification of the invention illustrated in Figures 1 and 2, the reel, among other things, includes a pair of end plates or members secured together in spaced apart parallel relation by a plurality of rods to form a frame. A spindle 1 supporting spool means 2 has one extremity journalled in one of the end plates of the frame and the other extremity in a bearing provided therefor in the end wall 3 of a round cup shaped cap member 4. The cap member may be constructed from any desirable material, but is preferably fashioned from pyroxylin plastic or phenolic condensate and is secured to the metal end plate 5 by screws or the equivalent to provide a housing or enclosure for the gear train or reel mechanism, including the structure embodying the invention. A generally V shaped metal abutment 6 carried by the end wall 3 of the cap substantially flush with its inner planar surface. The free extremities of the abutment are provided with apertures 7 and 8 within which are journalled the ends of the spindle 1 and shaft 9 of the level wind mechanism, respectively. The spindle 1 and shaft 9 are provided with pinions 10 and 11 which mesh with and are driven by a drive gear 12. A crank or drive shaft 13 is rotatably mounted in an outwardly extending tubular bearing 14 formed integral with the cap, and in an aperture provided therefor in the vertex of the V shaped abutment 6. The gear 12 is fixed to the inner extremity of the crank shaft and the outer extremity of the shaft carries an operating member or crank 15.

The crank 15 is secured in place by a screw 16 which is received within a threaded aperture 17 provided therefor in the outer end of the shaft 13. The crank is adapted to more or less bear against the free flat end of the tubular bearing portion 14 of the cap to limit inward movement of the shaft 13 and gear 12. The inner end of the crank shaft is provided with an enlargement 18 which engages the inner side or face of the gear to limit outward movement of the shaft and hold the gear in place. The inner extremity of the shaft 13 is preferably provided with an opening 19 of a predetermined depth.

The means generally designated 20 for creating or effecting the drag upon or the retardation of the driving means will now be described. The drag means, as stated above, although very simple in design and construction, has proven unusually effective and satisfactory in actual use. It is preferably constructed as an independent sub-assembly or unit which may be easily and quickly installed, by practically any mechanically inclined fisherman or mechanic, in any of the inexpensive standard or conventional fishing reels now in commercial use, with very little change or modification in the structure. It is primarily comprised of two parts or elements. One part is in the form of elongated flexible means generally designated 21 and the other part constitutes adjustable means generally designated 22.

The flexible means is preferably made from wire of everlasting flexibility, and one extremity thereof is caught within a recess 23 provided in an integral abutment 24 carried by the cap member near its periphery. Its other extremity is preferably fashioned to provide a transverse or lateral portion 25 which is seated in the opening or aperture 19 formed in the crank shaft 13. The portion 25 is preferably arranged concentrically in the opening 19 with its free end more or less in needle point engagement with the base of the opening, with sufficient clearance provided so that the said free end is the only portion of the flexible means that engages the crank shaft means 13 forming a part of the driving means.

The flexible means is provided with a bight, coil, or loop portion 26 intermediate its extremities, the latter of which project generally tangentially from the bight in opposite directions more or less in alignment with each other, as clearly illustrated in Figure 1. The bight portion 26 is internally threaded as indicated at 27.

The adjustable means 22 is preferably made in the form of a screw 28 which rides free in a hole 29 provided in the end wall 3 of the cap. The shank of the screw is threadedly received in the bight portion 26 of the flexible means and its head is preferably knurled so that a better grip may be obtained. By this arrangement rotation of the screw in one direction will cause the flexible means to be drawn inwardly so that the end of lateral portion 25 will bear against the base of the opening 19 formed in the inner extremity of the crank shaft 13 and create a drag directly thereon. The threads on the bight 26 end screw are of a pitch or character whereby the flexible means may be moved very slightly as compared to the rotational movement of the screw. The construction permits what is tantamount to a needle point adjustment which is very sensitive and effective for controlling the amount of friction or drag desired. Although the drag means has proven very satisfactory and durable in actual use, it should be noted that in the event that the threads on the bight should become slightly worn, it is merely necessary to remove the flexible means 21 from the reel and collapse the same to reduce the size of the bight 26 whereupon the means will better grip the screw; so that in effect the means is substantially of an everlasting or life-time character.

Very little pressure or bearing force of the flexible means against the crank shaft is required to obtain the desired drag, and this is partly due to the fact that resilient means 30, preferably in the form of a fibre or leather annular washer, carried by the shaft 13 is disposed between the abutment 6 and the drive gear 12 is clearly illustrated in the left section of Figure 2. The washer is preferably partially seated or inset in a recess 31 provided in the outer face of the gear and of a relatively large diameter so that the contact or frictional surface area between the sides of the washer and the abutment and gear is quite extensive or substantial. The washer is preferably of such a character that when the flexible means 21 is more or less in an inoperative position the crank shaft and gear will run practically free with the washer providing a smooth bearing surface. Attention is directed to the fact that through the application or use of either the resilient means or flexible means, or both, a very smooth acting reel mechanism is provided and one which will stand up when subjected to hard usage because at least certain parts of the mechanism are resiliently mounted, and all vibration or chatter is thus practically eliminated.

Obviously, the resilient washer 30 may be omitted, in which event, the outer face of the drive gear 12 or the face of the abutment 6, or both would be provided with a boss or bosses which would engage each other when the flexible means is functioning. Also, the washer may be constructed of any material to accomplish the desired results. Moreover, it is to be understood that the flexible means 21 could be made non-flexible or rigid, and that means other than the specific adjusting means could be employed advantageously.

Figures 3, 4:
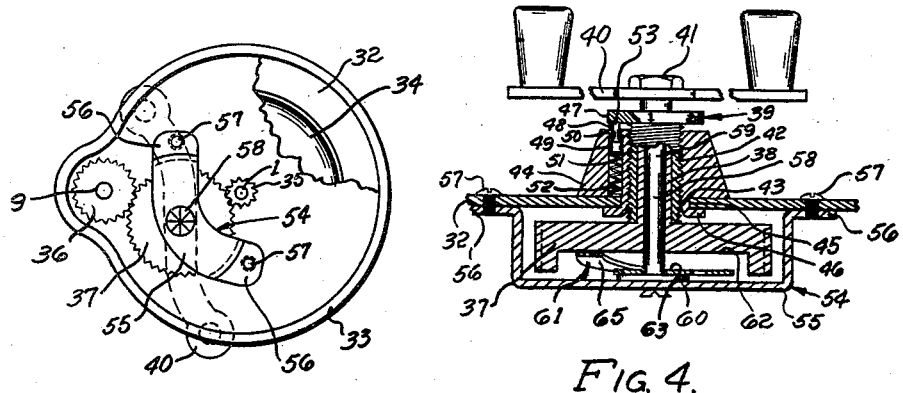
Figure 3 is an end view of a reel somewhat similar to Figure 1, showing the application of a second embodiment of the invention thereto.
Figure 4 is a transverse section taken through a part of Figure 3 depicting certain principles of construction.

Referring now to the second embodiment or modification of the invention illustrated in Figures 3 and 4, numeral 32 represents the end wall of a cap or conventional enclosure 33 housing parts or elements of a reel mechanism. Spool means 34 is mounted on a spindle or axle carrying a pinion or small gear 35, which gear including the level wind gear 36 are driven by a larger gear 37. The drive gear 37 is preferably provided with an integral tubular cylindrical portion 38, constituting the crank shaft, which is journalled in tubular adjustable means generally designated 39. Operating means in the form of a crank 40 is secured to the free extremity of the tubular portion 38 by a screw 41 whereby the crank will rotate or drive the gear 37. The adjustable means 39 includes a tubular part 42 exteriorly threaded for disposition within a tapped or threaded aperture 43 provided in a bearing member 44 permanently secured to the end wall 32 of the cap. The bearing member 44 is secured to the end wall 32 by providing the member with a protuberance which extends through an aperture 45 provided therefor in the wall and upsetting or flanging the free end of the protuberance over and against the inner surface of the wall as indicated at 46. The adjustable means 39 also includes a knurled annular head part 47 provided with suitable indicia on its periphery, as clearly illustrated. The outer surface of the bearing 44 is provided with means, not shown, with which the indicia just referred to is adapted to register whereby one may clock or dial the amount of drag or friction desired.

Positioning or indexing means are provided for holding the adjustable means in predetermined positions, and this is preferably accomplished by forming a ring of indentations or concave seats adjacent the under side or surface of the head or thumb part 47, and providing spring pressed detent means which is adapted to cooperate with the indentations. The detent preferably includes a shank portion 48 and an enlarged end portion 49 which reciprocate in an aperture 50 and counterbore 51 thereof respectively, extending longitudinally within the fixed bearing 44. A helical spring 52 is disposed in the counterbore with one extremity seated against the end wall 32 of the cap and its other extremity engaging the enlarged end portion 49 of the detent for urging the latter outwardly so that the rounded free end of the shank portion 48 may cooperate with the indentation or seat 53 as desired by merely rotating the adjustable means. It will be observed that the detent and spring elements are easily and quickly assembled with the fixed bearing and are held in place by the cap member. This improved assembly has proven very advantageous because it prevents the loss of the elements and tampering.

Provision is made for reinforcing and stabilizing the movement of certain parts of the driving mechanism and will now be described. A metal bridge or bracket member generally designated 54 is carried by the end wall 32 of the cap. The bridge includes a flat or planar portion 55 and a pair of leg portions, the feet 56 of which are secured to the end wall by screws 57 or the equivalent so that the flat portion is arranged in spaced apart parallel relation with respect to the inner substantially planar surface of the said end wall. A stub shaft or pintle 58 has one end fixed to the central area of the flat portion and its other and free extremity 59 is disposed axially and forwardly in the tubular portion 38 formed integrally with the gear 37 and as stated above this portion constitutes the drive crank or drive shaft of the mechanism and is rotatably mounted in the adjustable means 39. This stub shaft serves to maintain the crank shaft substantially axially in the means 39 or perpendicular to the plane of the end wall 32. In other words the shaft acts as a stabilizing element to prevent vacillation or wobbling of the crank shaft and parts associated therewith. The end of the stub shaft connected to the bridge 54 is provided with an annular enlargement which forms an abutment 60.

Figure 8:
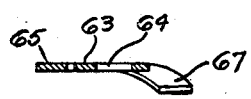
Figure 8 is a section taken substantially on line 8—8 of Figure 7.

Flexible means generally designated 61 for creating the friction or drag on the driving means is preferably carried by the stub shaft 58 and is interposed between the annular enlargement 60 and the drive gear. Although not essential, the inner side of the drive gear 37 is preferably recessed so as to provide a seat or pocket 62 for the reception of a part of the flexible means. The flexible means 61 may be constructed from any material desired, but is preferably made from flat resilient sheet metal stock and fashioned generally in the form of a round coil or loop. As clearly illustrated in Figure 8, the flexible means preferably includes a generally round central portion 63 provided with a hole 64 which receives the forwardly extending shank portion 59 of the stub shaft. The central portion 63 is substantially of the same diameter as the enlargement or abutment 60 formed on the stub shaft and engages the same. The flexible means also includes a circular or ring-like portion 65 integral with and extending more or less about or concentrically in spaced apart relation to the central portion. One extremity of the portion 65 is preferably connected to one side of the central portion at 66 and preferably fashioned so that the portion 65 generally inclines throughout substantially its entire length from this point of connection or juncture to its free extremity 67. Otherwise expressed, an outer portion of the flexible means is offset with respect to an inner portion thereof or, it might be said that the flexible means is comprised of a washer having a yieldable tongue or resilient portions. This form of flexible means has proven to be exceptionally effective and durable in actual use.

It will thus be manifest that manipulation of the adjustable means 39 in a clockwise direction will force the drive gear rearwardly to compress the flexible means so that at least the free extremity 67 of the portion 65 and or other portions will be forced or urged to bear against the base of the recess or pocket 62 formed in the drive gear 37 to create the amount of friction or drag desired on the driving means of the mechanism. The detent or positioning means functions to hold the adjustable means in the position to which it has been adjusted, and the cooperating indicia on the thumb part 47 and bearing 44 assists the caster in setting or dialing the adjustable means to successively obtain the desired degrees of tension on the drag means after the same has once been determined or ascertained. When the adjustable means is rotated in a counter-clockwise or opposite direction the friction will obviously decrease. The construction is such that when the drag means is rendered practically inoperative the outer side of the drive gear 37 may rotate against the upset or flange portion 46 provided on the fixed bearing 44. More specifically, the arrangement provides for a metal to metal contact with the flexible means bearing against a stationary part of the reel and against the driving means. The flexible means is somewhat similar to the first embodiment of the invention because practically all thrust and vibration between the elements of the reel mechanism are substantially eliminated. The driving means is, in effect resiliently mounted. This fact, too, is of great importance because the flexible means will absorb or take any reasonable shock to which the driving means may be subjected by hard use, accidental fall of the reel, or otherwise. The flexible means may slightly rotate with respect to the stub-shaft 59, or if found desirable may be secured against rotation. Also, it will be evident that the position of the flexible means may be reversed, in which event the central portion 63 of the flexible means would normally bear against the base of the recess 62 or inner side of the drive gear and at least a portion of the curved portion 65 of the flexible means would bear against an annular enlargement or abutment of a diameter somewhat greater than the enlargement 60, or, the enlargement might be eliminated entirely, whereupon the flexible means would engage the flat portion of the bridge or bracket 54. Moreover, it is to be distinctly understood that means other than the specific adjustable means depicted may be employed. In fact actual tests have very definitely proven that adjustable means are not essential because flexible means of different physical properties may be used.

Figure 5:
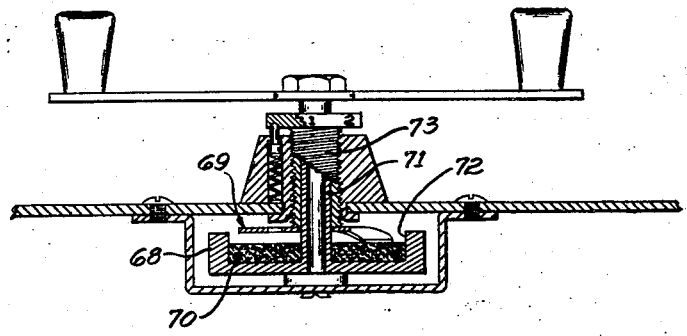
Figure 5 is a partial view of a reel showing a third application or embodiment of the invention.

The third embodiment of the invention illustrated in Figure 5, except for the character of the drive gear 68, the disposition of the flexible means 69, and the addition of resilient means 70 substantially corresponds in all important respects to the second embodiment of the invention. The drive gear as herein shown is provided with a longer crank or drive shaft 71 and the outer face or side of the gear is provided with a recess 72 within which is seated the resilient means 70, which may be constructed of any desirable material such as leather or fibre. It will be noted that the flexible means 69 corresponds to the flexible means 61 above referred to. The flexible means 69 is carried by the crank shaft 71 and is preferably disposed between the adjustable means 73 and the resilient means 70, so that the central portion of the flexible means bears against the inner extremity of the adjustable means and the outer concentrically arranged portion will engage the resilient means 70 to produce the desired drag or friction. By this arrangement it will be observed that the desired drag or friction may be easily and quickly obtained by merely operating the adjustable means. The particular flexible means shown has proven very satisfactory in actual use but of course flexible means of a different character could also be used to obtain substantially corresponding results in function. Also, it will be obvious that a regular flat washer might be used in lieu of the flexible means, in which event the adjustable means would press the washer against the resilient means. Furthermore, if found desirable, the resilient means could be disposed on the inner or rear side of the drive gear for engagement with a fixed abutment of a diametrical size more or less corresponding to that of the resilient means, in which event the flexible means would bear against the front side of the drive gear. Moreover, the flexible means could be entirely eliminated in the arrangement just referred to.

Figure 6:
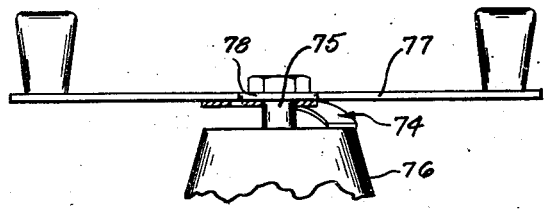
Figure 6 is a partial view of a fourth embodiment of the invention.
Figure 7:
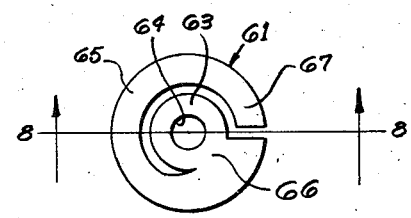

In the fourth embodiment of the invention depicted in Figure 6, flexible means 74 corresponding to the flexible means 61 is carried by the crank shaft 75 and arranged between the fixed bearing 76 and the crank 77. The construction is such that the flexible means normally bears against the outer extremity of the bearing and the central circular portion 78 of the crank whereby to obtain the desired drag.

In view of the foregoing, it will be manifest that improved principles of design and construction have been embodied in a reel structure whereby to create the desired drag upon the driving means of the reel, which from a good engineering standpoint is the proper means to be controlled, since at least a part thereof acts as a fly wheel and is responsible for any overrun or back-lash of the line.

It is to be distinctly understood that the terms flexible means, resilient means, driving means, and adjustable means are used broadly. The term driving means as defined in the claims may include the main drive gear or any gear in chain therewith, crank shaft, or crank means, separately, or may be a combination of same.

Having thus described my invention, it is to be understood that various slight changes might be made in the general form and arrangement of parts described without departing from my invention, and hence I do not limit myself to the precise details set forth, but consider myself at liberty to make such changes and alterations as fairly fall within the spirit and scope of the appended claims.

I claim:

1. A reel comprising a frame, a spool rotatably mounted in said frame, a drive shaft having a gear for operating the spool, a recess in said gear, resilient means disposed in said recess and engaging a part of said frame, and means for urging the shaft outwardly so that the resilient means will influence and retard the movement of the gear as desired.

2. A reel comprising, a frame including an end member, a spool rotatably mounted in said frame, a drive shaft journalled in said end member, a gear member carried by said shaft, a recess provided in one of said members, an element having a relatively large braking surface disposed in said recess between said members, and means bearing on the shaft for urging the gear in a direction to cause the element to effect a braking action upon the gear.

3. A reel comprising, a frame, a spool rotatably mounted in said frame, a shaft including a gear operatively related to the spool, a recess in said gear, resilient means disposed in said recess and engaging a portion of said frame, a flexible member having one end carried by another portion of the frame and another end engageable with the inner extremity of said shaft, and adjustable means for tensioning said flexible member to cause the shaft to move in a direction whereby the resilient means is influenced to effect a braking force upon the gear.

4. A reel comprising, a frame, including an end member, a spool rotatably mounted in said frame, a drive shaft having an axial opening in its inner end, a gear carried by said shaft, resilient means interposed between said gear and said end member, an elongated flexible element, the outer end of said element being fixed to a part of the frame and its inner end having a bent portion disposed in said axial opening, said element also being provided with an internally threaded portion intermediate its ends, and a screw threadedly connected to said end member and to said threaded portion for pulling the shaft and gear as a unit in an outward direction to cause the resilient means to create a braking effect upon the gear.

5. A reel comprising, a frame including an end member, a spool rotatably mounted in said frame, a drive shaft journalled in the end member, said shaft being provided with an annular member of a relatively large diameter adjacent its inner end, a recess provided in one of said members, a washer having resilient properties disposed in said recess between said members, and a wire element having one end fixed to the frame and its other end engaging and forcing the shaft in a direction to cause the washer to effect a braking force on the annular member.

6. A reel comprising, a frame, a spool rotatably mounted in said frame, a drive shaft having a gear secured thereto, a recess in said gear, a brake shoe disposed in said recess between said gear and a part of the frame, and an elongated resilient wire having one end secured to the frame and its other end engaging the shaft for pressing the gear in an outward direction to cause the shoe to effect a braking force upon the gear.

7. A reel comprising, a frame including an end member, a spool rotatably mounted in said frame, a drive shaft having a gear member secured thereto, a brake shoe surrounding said shaft disposed within the confines of the frame between said members, and a flexible member having one end secured to the frame and its other end yieldably engaging and forcing the shaft in an outward direction to cause the gear to press the shoe against the end member and obtain a braking effect upon the gear.

JOHN V. SCHAFER.